United States Patent [19]
Laor

[11] Patent Number: 6,031,947
[45] Date of Patent: Feb. 29, 2000

[54] 1×N OPTICAL SWITCH

[76] Inventor: Herzel Laor, 2050 Hillsdale Cir., Boulder, Colo. 80303

[21] Appl. No.: 09/092,124

[22] Filed: Jun. 5, 1998

[51] Int. Cl.[7] .................................................. G02B 6/26
[52] U.S. Cl. ................................ 385/22; 385/16; 385/24
[58] Field of Search .................................... 385/16–24, 27

[56] References Cited

U.S. PATENT DOCUMENTS

| | | | |
|---|---|---|---|
| 4,220,396 | 9/1980 | Antell | 350/96.15 |
| 4,239,330 | 12/1980 | Ashkin et al. | 385/22 |
| 5,177,348 | 1/1993 | Laor | 250/201.1 |
| 5,930,419 | 7/1999 | Trouchet | 385/27 |

*Primary Examiner*—Phan T. H. Palmer
*Attorney, Agent, or Firm*—Benman & Collins

[57] ABSTRACT

A 1×N fiber optic switch (12) is used to interface a service unit (14) which includes a single fiber optic connection (16) with a serviced unit (20) that includes multiple fiber optic connections (22). The switch (12) includes a first ferrule (24) for receiving at least one optical line on a first side of the switch (12) and a second ferrule (26) for receiving N optical lines on a second side of the switch (12). The switch (12) further includes a closed loop, servo alignment control system (30) for selectively aligning fiber ends at the switch interface. The first ferrule (24) and second ferrule (26) are preferably arranged in nearly contact in relationship and an index matching fluid or gel may be provided at the interface. Also disclosed are certain compact packing arrangements for the switch fibers, and various offset fiber arrangements for enhanced alignment control.

22 Claims, 9 Drawing Sheets

Diameter of circulation

A ——————— A

A————A

B————B $d_1 > d_2$
$d_1 < d_2$ or

1×N OPTICAL SWITCH

FIELD OF THE INVENTION

The present invention relates to fiber optic switches and, in particular, to a 1×N switch with minimal optical losses that can accommodate a large number of possible switch connections, e.g., N may range from 2 to 1000 or greater.

BACKGROUND OF THE INVENTION

1×N fiber optic switches are used in a variety of applications. In a telecommunications system, a 1×N switch may be used for test equipment access. Such test equipment is used, for example, to periodically test the various optical lines having terminals at a switch interface. In such a case, a 1×N optical switch can be utilized to alternately interface a single optical test bench with N optical lines. Similarly, 1×N switches are used in manufacturing for optically testing parts. The 1×N switch can allow a single piece of test equipment to be used for testing multiple components for enhanced efficiency and accuracy. In data communications systems, a 1×N switch can be used to interface a test terminal with several network trunk lines or the like. Many other applications of 1×N switches are possible.

Such 1×N switches generally include structure for supporting a single communications fiber end on one side of a switch interface, structure for supporting N communications fiber ends (typically in an array of rows and columns) on the opposite side of the interface, and an alignment system for selectively aligning the single fiber end with any of the N fiber ends. The alignment system may involve moving the fibers, bending the fibers or altering an optical path across the switch interface using mirrors or the like. In any case, the switch interface may have a significant width, involve a number of optical components, or otherwise allow for substantial optical dispersion, diffraction, absorption and/or misalignment. Even if lenses are carefully positioned and aligned to focus signals on the fiber ends, such switches tend to entail significant optical losses. In this regard, typical optical switches have optical losses on the order of 0.7–1.5 dB. Moreover, such switches often involve substantial spacing between fibers and bulky control components for fiber alignment and, therefore, are typically limited in numbers of possible line connections, for example, to 1×36.

SUMMARY OF THE INVENTION

The present invention is directed to a 1×N optical switch that addresses the limitations of certain conventional switches. In particular, it is believed that the switch of the present invention will enable improved loss performance, e.g., losses of only 0.2–0.4 dB. Moreover, the switch will accommodate a wide range of switch options, e.g., N=2 to N=1000 or greater. The present invention also allows for compact switch design, close control of optical alignment across the switch interface, and minimization of alignment control components.

The optical switch of the present invention is referred to herein as a 1×N optical switch to indicate that components on a first side of the switch are alignable as a unit relative to N fiber ends on the opposite side of the switch. It will be appreciated that the first side components may include two, three or more communications fiber ends, if desired, as well as control fiber ends and other components. For example, more than one communications fiber may be employed on the first side to allow multiple second side fibers to be interfaced with any of a selection of sources, detectors, test equipment etc. or to simultaneously make multiple, spatially dependent connections. Such switches, constructed in accordance with the present invention, may alternatively be thought of as 2×2N, 3×3N (etc.) switches. For example, separate transmit and receive fibers may be utilized on the first side of the switch. However, in the embodiments described in detail below, such first side components are not adapted for simultaneous independent alignment and full N×N functionality.

According to one aspect of the present invention, an index matching material, such as an index matching liquid or gel, is provided at the switch interface of a 1×N optical switch to reduce reflection/refraction losses. In particular, the switch includes a first ferrule containing at least a first fiber end of a communications fiber ("communications fiber end") and a second ferrule containing N communications fiber ends, where N is an integer of at least 2. The ferrules are arranged so that the first communications fiber end and the N communications fiber ends are optically opposed across a switch interface therebetween. In this regard, although folded optical arrangements or a wide switch interface geometry are possible, the ferrules are preferably arranged in a closely abutting or nearly contacting relationship. For example, where the first communications fiber terminates in a first face of the first ferrule and the N fibers terminate in a second face of the second ferrule, the first and second faces may be arranged in substantially parallel alignment with a spacing between the faces of less than about 10 micrometers and, more preferably, are nearly touching.

The ferrules are interfaced within a housing or the like for containing the above-referenced index matching material so as to define a low loss optical transmission interface unit. More particularly, the communications fibers can all be formed from similar optical materials having a similar index of refraction, e.g., an index approximately equal to the index of quartz. Accordingly, in such a case, the index matching material can be selected to provide a similar index so that light (including infrared and ultraviolet radiation) reflection is minimized at the interface. The index matching material preferably also has a viscosity that allows for relative movement as between the ferrules while maintaining good contact between the index matching material and the fiber ends. For applications that are particularly sensitive with regard to reflected signals, the fiber ends of the first and/or second ferrules can be angled so that any signals reflected from a fiber end will have an angle of reflection greater than the acceptance of fiber, i.e., the maximum angle at which a signal can be captured by and transmitted within the fiber.

The preferred inventive switch further includes a mechanism for providing relative movement between the ferrules so as to optically align the first communications fiber end with a selected one of the N communications fiber ends. One or both of the ferrules may be moved in this regard. For example, an electrical motor or other electromechanical unit may be used to drive the first ferrule in a first dimension, (say, horizontally) and a second electromechanical unit can be used to drive the second unit in a second dimension (say, vertically) so as to allow for relative two-dimensional alignment of the ferrules and their respective fibers.

According to another aspect of the present invention, an alignment control system for a 1×N optical switch is provided. The control system is implemented in conjunction with a 1×N switch including first and second ferrules as described above, where an index matching material is preferably provided at the switch interface. In addition to the first communications fiber end, the first ferrule includes a number of control fiber ends disposed in predetermined spatial relationship to the communications fiber end. Similarly, for each communications fiber end of the second ferrule, a number of control fiber ends are provided in predetermined spatial relationship thereto. The control fibers are used to transmit control signals across the switch interface. Corresponding control fiber ends of the first and second ferrules may be arranged relative to the communications fiber ends and one another such that the control fiber ends are in alignment or are offset when the communications fiber ends are properly aligned. As set forth below, an offset relationship provides control advantages for certain applications. For a given connection between the first communications fiber end of the first ferrule and a selected communications fiber end of the second ferrule, proper alignment can be attained by analyzing control signals transmitted between corresponding control fibers associated with the first fiber end and the selected fiber end, e.g., the relative strengths of the signals. In this regard, one or more control signal sources are coupled to certain control fibers of the first and/or second ferrule and one or more signal detectors are coupled to certain control fibers of the first and/or second ferrules in an arrangement sufficient to provide the desired control signal communication for alignment control.

According to another aspect of the present invention, a control system such as described above is implemented with the control signal source system and control signal detector system located on the same side ("first side") of the switch, i.e., the source system and detector system are coupled to control fibers of the same ferrule. In order to accomplish such an arrangement, second side control fibers of the opposite ferrule (the ferrule not having control fibers directly coupled to the source and detector systems) receive and reflect, redirect or otherwise re-transmit the control signals back to the first side control fibers for detection. For example, the second side control fibers can be terminated at a mirror for reflecting the control signals or a single (or spliced) second side control fiber may be looped such that its ends serve as two of the second side control fiber ends. In order to minimize control components, the source and detector systems are preferably coupled to the "1" side of the 1×N switch.

According to another aspect of the present invention, a packing arrangement is provided for the communications fiber(s) and control fibers of the first and/or second ferrule so as to maintain the desired spatial relationship of the fiber ends and allow for more compact packing of the fibers. Such compact packing allows for smaller switch dimensions and improved response time. In particular, in accordance with the present invention, a ferrule contains a number of fibers including at least one communications fiber and at least one control fiber. The fibers are packed so that at least some of the fibers contact at least two adjacent fibers in a manner that prevents relative movement as between the contacting fibers. In addition, the fibers are contained within an opening of the ferrule that is dimensioned to maintain the fibers in the desired packing spatial relationship. Disclosed below are particular hexagonal fiber packing arrangements, packing arrangements/ferrule opening shapes that allow for offset spacing of particular fibers, as well as other geometric and optical arrangements for archiving offset performance.

As noted above, it is possible in accordance with the present invention to arrange the first side fiber(s) and second side fibers in nearly contacting positions with only an index matching material (and no optics) disposed therebetween. In some cases, it may be desired to provide more space between the first side fiber(s) and second side fibers. In such cases, lenses may be utilized to focus the optical signals on the fiber ends. In the case of an air interface, the fiber ends may be terminated in a plate to facilitate application of an anti-reflective coating. The plate is made of quartz or glass which substantially matches the fiber index.

BRIEF DESCRIPTION OF THE DRAWINGS

For a more complete understanding of the present invention and further advantages thereof, reference is now made to the following description taken in conjunction with the drawing in which.

DETAILED DESCRIPTION OF THE INVENTION

Figure 1:
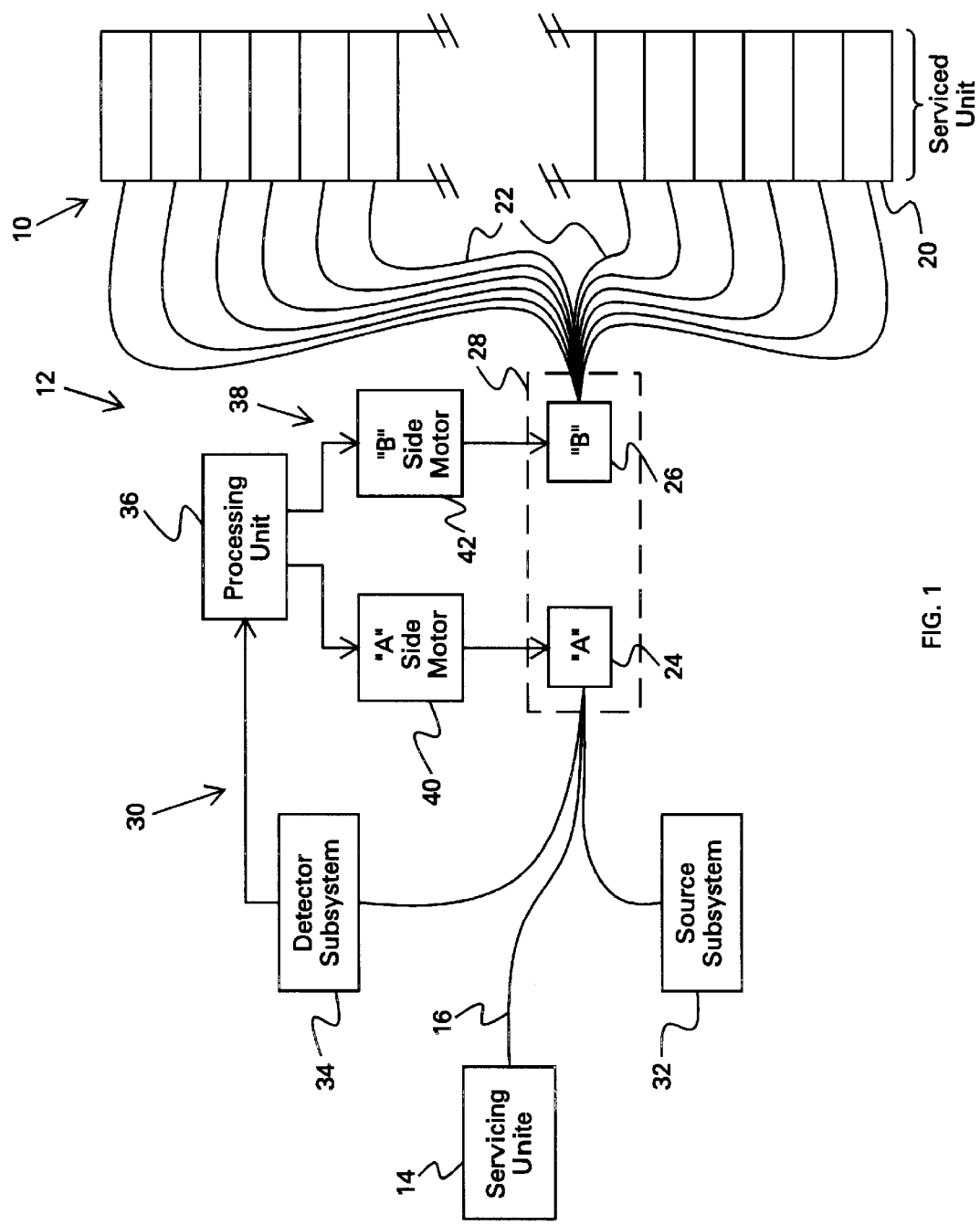
FIG. 1 is a schematic diagram showing a fiber optic system incorporating a 1×N fiber optic switch in accordance with the present invention.

FIG. 1 shows a fiber optic system 10 including a 1×N fiber optic switch 12 in accordance with the present invention. In the illustrated embodiment, the switch 12 is used to interface a servicing unit 14 which includes a single fiber optic connection 16 with a serviced unit 20 that includes multiple fiber optic connections 22. The switch 12 can be used in a variety of such 1×N switching applications. For example, the serviced unit 20 may include fiber coupled lasers and the servicing unit 14 may be test equipment used to perform e.g., burn-in tests of the manufactured lasers. Alternatively, the serviced unit 20 may include a number of communications lines of a telecommunications network and the servicing unit 14 may include an optical bench for periodically testing the lines. Many other 1×N switching applications are possible. It will thus be appreciated that signals may be transmitted across the switch 12 in either or both directions. Moreover, as will be understood upon consideration of the description below, more than one unit may be accommodated on the "1" side of the switch 12 (for example, to test transmit/receive units).

Generally, the switch 12 includes a first ferrule 24 for receiving at least one optical line on a first side of the switch 12 and a second ferrule 26 for receiving N optical lines on the second side of the switch 12. For convenience, the first side will be designated "A" throughout this description and the second side will be designated "B". The ferrules 24 and 26 are contained within a switch housing 28. The switch 12 further includes a closed loop, servo alignment control system 30 for selectively aligning fiber ends at the switch interface as will be better understood upon consideration of the description below. The control system 30 includes a control signal source subsystem 32, a control signal detector subsystem 34, a processing unit 36 and an actuator subsystem 38 for relative positioning of the ferrules. The control signal source subsystem 32 includes one or more signal sources, such as an LED's, lasers or other sources of light or nonvisible spectrum electromagnetic signals. In the illustrated embodiment, the source subsystem 32 includes four LED's for providing for optical signals used for two-dimensional alignment.

The control signal detector subsystem 34 includes one or more detectors for receiving the control signals. The detector subsystem 34 and source subsystem 32 may be both located either on the A side or on the B side of the switch or may be located on opposite sides of the switch. In the illustrated embodiment, the subsystems 32 and 34 are depicted as being both located on the A side of the switch. This arrangement, though not necessary, allows for minimization of the control components. The illustrated detector subsystem 34 includes four signal detectors for separately detecting the control signals. It will be appreciated, however, that a signal detector employing time division multiplexing, wavelength division multiplexing or detector area discrimination could be utilized to detect multiple control signals.

The output from the detector subsystem is provided to a processing unit 36 for making alignment calculations. As will be understood upon consideration of the description below, the processing unit 36 can calculate any required alignment corrections based on the detected control signals in combination with knowledge of the relative geometry of the control fibers and communications fibers in the ferrules.

The required alignment corrections are implemented by the actuator subsystem 38. The actuator subsystem 38 is capable of providing two dimensional relative motion as between the ferrules 24 and 26 to achieve the desired alignment. In this regard, it will be appreciated that either or both of the ferrules 24 and/or 26 may be positioned by the actuator subsystem 38. In the illustrated embodiment, for convenience, the actuator subsystem 38 includes an A side motor 40 and a B side motor 42. The motors 40 and 42 may comprise, for example, electrical motors or other electromechanical units. Each of the motors 40 or 42 in the illustrated embodiment is adapted for positioning the corresponding ferrule 24 or 26 in one dimension. For example, the A side motor 40 may be adapted for horizontally positioning the A ferrule 24 and the B side motor 42 may be adapted for vertically positioning the B side ferrule 26. In this manner, two dimensional positioning is possible for alignment.

The ferrules 24 and 26 are contained within a switch housing 28. In accordance with the present invention, the ferrules 24 and 26 are preferably positioned in a nearly contacting relationship to minimize dispersion and optical losses at the switch interface. More particularly, the opposing faces of the ferrules 24 and 26 are preferably spaced by a distance of less than about 10 micrometers. To facilitate very close positioning of the opposing faces of the ferrules 24 and 26, the ferrules 24 and 26 are preferably constructed as follows. In each ferrule 24 or 26, the fibers are glued into position with the fibers terminating substantially at the face of the ferrule 24 or 26. The ferrule faces with the fiber ends are then polished flat providing a substantially planar surface. In this regard, the ferrules 24 and 26 are preferably made from a material that is somewhat harder than the fibers so that the fibers will not protrude upon polishing. For example, if the fibers are formed from quartz, alumina or carabid ceramics may be used for constructing ferrules 24 and 26.

Within the housing 28, the interface between the opposing faces of the ferrules 24 and 26 is filled with an index matching material in accordance with the present invention. The index matching material preferably has an index of refraction that is similar to or substantially the same as the indices of the fibers. Again, if the fibers are formed from quartz, the index matching material will have an index of refraction substantially equal to that of quartz. By providing such index matching material, rather than allowing an air interface, reflection of communications signals at the fiber ends is reduced and optical losses are minimized. It is desirable for the index matching material to maintain good contact with the fiber ends, to not unduly resist relative motion as between the ferrules 24 and 26 and, more preferably, to provide a degree of lubrication between the ferrule faces so as to facilitate a nearly contacting relationship between the faces. Accordingly, the index matching material is preferably an appropriate liquid or gel.

Figure 2A:
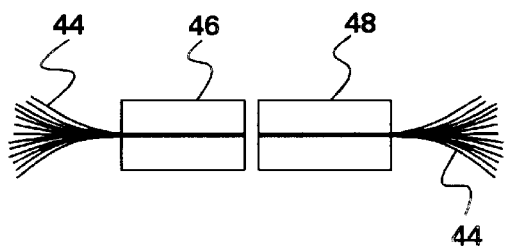
FIGS. 2A and 2B are side and perspective views, respectively, showing a switch interface in accordance with the present invention.
Figure 2B:
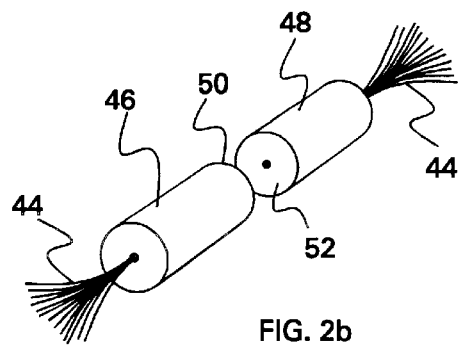

FIGS. 2A and 2B illustrate one embodiment of the switch/ferrule interface. As illustrated, the fibers 44 of each side are contained within an opening formed in the corresponding ferrule 46 or 48. The illustrated ferrules 46 and 48 terminate in substantially planar faces 50 and 52 that are oriented substantially perpendicular to the axes of the fibers 44. In operation, the ferrules 46 and 48 are positioned in a nearly contacting relationship. It will therefore be appreciated that positioning, for alignment purposes, can be accomplished by relative movement as between the two ferrules in two dimensions that are substantially perpendicular to the axes of the fibers 44 within the ferrules 46 and 48.

Figure 3A:
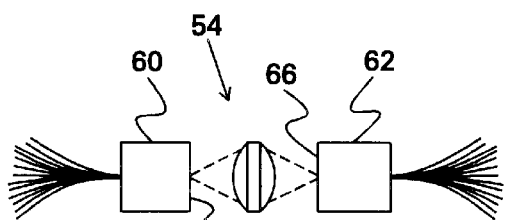
FIG. 3A is a side view showing a further alternative switch interface in accordance with the present invention.

FIG. 3A shows an alternative switch/ferrule geometry. In some cases, the mechanical close proximity of the opposing ferrules may be difficult to achieve, or too expensive. In such cases, a lens may be provided at the interface between the ferrules to focus signals on the fiber ends. The lens may include several glass elements. The ferrules 60 and 62 and lens assembly 54 are geometrically arranged so that the end surface 64 of the first ferrule 60, and the end surface 66 of the second ferrule 62 are imaged upon each other.

Figure 3B:
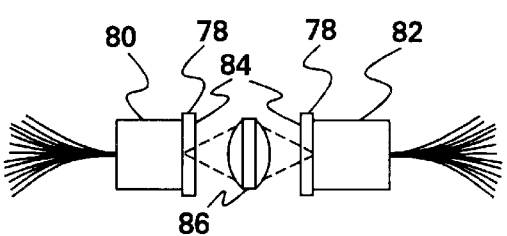
FIG. 3B shows a still further alternative switch interface in accordance with the present invention.

A further switch ferrule geometry is shown in FIG. 3B. In this case a plate 78 of quartz or glass with refractive index matching that of quartz is bonded to the end surface of each ferrule 80 and 82 using an index matching epoxy. The exposed surface 84 of each plate 78 can be readily coated with an anti-reflective coating to minimize reflections at the air interface. A lens assembly 86, such as described above, is used to focus signals on the fiber ends. In this manner, optical losses are minimized without using an index matching liquid or gel at the interface.

Figure 3C:
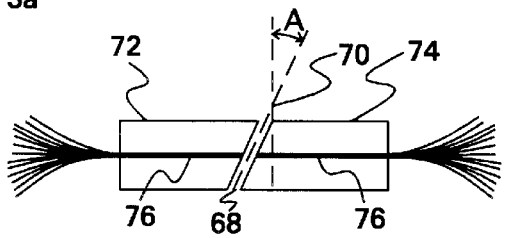
FIG. 3C shows an angled switch interface for reflection intolerant applications.

FIG. 3C shows a further alternative switch/ferrule geometry. In this case, the opposing faces 68 and 70 of the ferrules 72 and 74 are disposed at an oblique angle relative to the fibers 76. Such an arrangement may be preferred for certain applications that are intolerant to signal reflection. More particularly, if there is an imperfect match between the indices of the fibers 76 and the index matching material, or if there is otherwise irregularity that results in reflection of the optical signals at the switch interface, a portion of the optical signals may not be properly transmitted across the switch interface despite proper alignment of the opposing fibers 76. This reflected portion of the optical signals could propagate back in the fiber it arrived from in the absence of the illustrated geometry. The illustrated geometry is selected such that the angle A is greater than half of the acceptance angle of the fibers 76 (reflection angle is double the incidence angle). In this manner, any reflected signal will not be transmitted through the fiber.

Figure 4A:
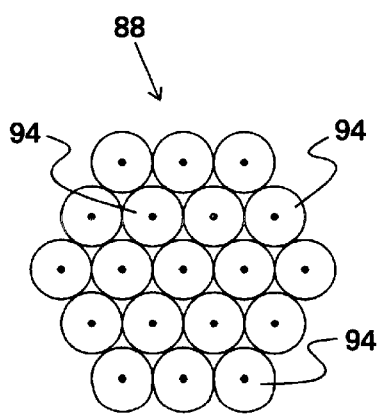
FIG. 4A is an end view showing a fiber packing arrangement in accordance with the present invention.
Figure 4B:
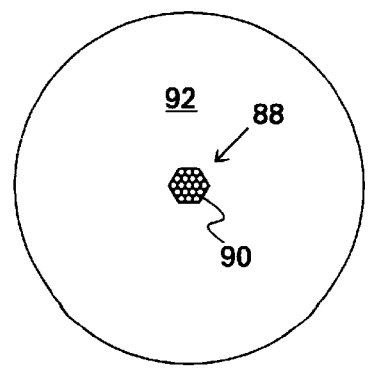
FIG. 4B is a perspective view showing the fiber packing arrangement of FIG. 4A incorporated into a ferrule.

FIGS. 4A and 4B show a fiber bundle 88 and the bundle 88 contained within an opening 90 of a ferrule 92, respectively. In order to allow for accurate alignment, it is important that the control and communications fibers maintain a fixed relative spatial relationship. Moreover, in order to reduce the switch size and improve response times, it is desirable to reduce the spacing between fibers. In this regard, FIGS. 4A and 4B illustrate a compact fiber packing arrangement in accordance with the present invention. In particular, the fibers 94 are maintained in their desired positions due to contact with surrounding fibers 94 and, in the case of the outermost fibers, due to contact with the opening 90 which is dimensioned inhibit movement of the fibers 94. The fibers are then glued in place within the ferrule to prevent movement. In the illustrated embodiment, the fibers 94 are packed in a hexagonal arrangement, i.e., each of the inner fibers is surrounded by six fibers arranged in contacting side-by-side relationship, and the opening 90 is hexagonal in shape. In addition to providing compact packing, this arrangement is convenient because the fibers 94 will gravitate to their proper positions upon insertion into the hexagonal opening 90 and, therefore, do not require careful positioning. Another option is to hold fibers 36 in an elastic material which will compress the fiber bundle 88 together automatically creating hexagonal arrangement.

Figure 5:
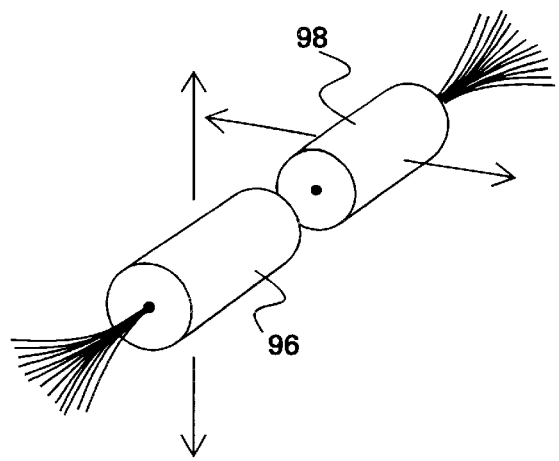
FIG. 5 is a perspective view illustrating one possible positioning mechanism for fiber alignment.

FIG. 5 schematically illustrates one possible actuating arrangement for aligning fibers. In order to align an A side communications fiber with any selected B side communications fiber, two dimensional relative positioning between the ferrules 96 and 98 is provided. Such positioning can be achieved by moving one or both of the ferrules 96 and/or 98. In the illustrated embodiment, the A side ferrule 96 is adapted for one-dimensional vertical movement and the B side ferrule 98 is adaptable for relative horizontal movement. Accordingly, any desired alignment manipulation can be implemented using simple linear drive mechanisms. The required movements can be easily determined by resolving the repositioning vector into its orthogonal components.

Figure 6A:
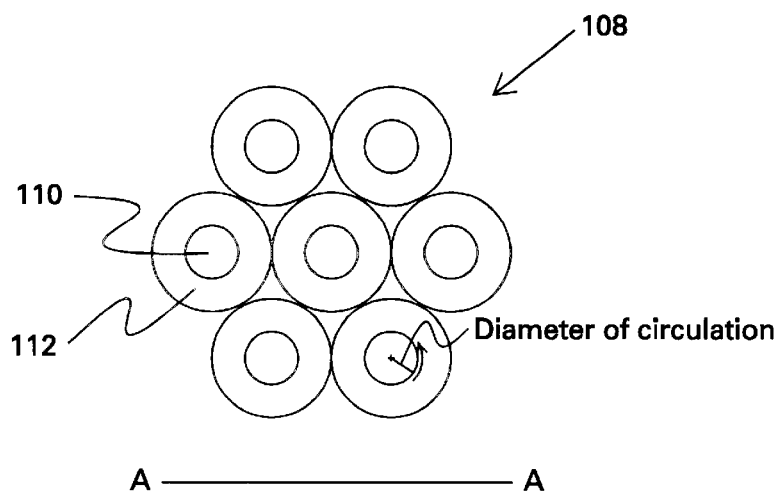
FIGS. 6A–6C illustrate a fiber packing arrangement for a 1×N switch interface in accordance with the present invention.
Figure 6B:
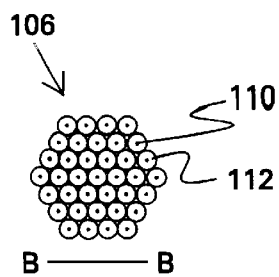
Figure 6C:
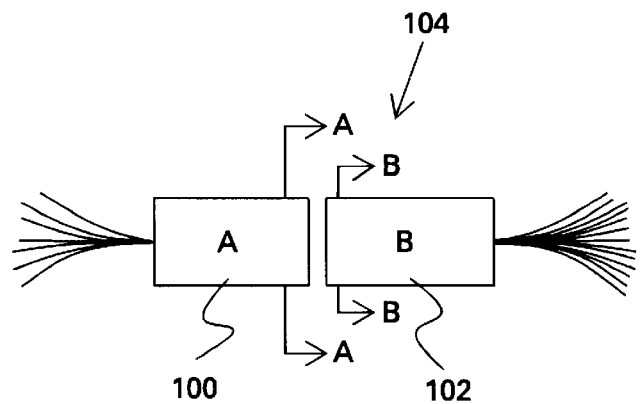

One type of servo alignment control may be implemented by moving one of the ferrules in a circular way relative to the second ferrule. FIG. 6C shows A and B side ferrules 100 and 102 of a 1×N switch 104. FIG. 6B shows a cross-section of the B side fiber stack 106 taken along cut-line B—B. FIG. 6A shows a magnified cross-section of the A side fiber stack 108 taken along cut-line A—A. The fiber stacks 106 and 108 each include at least one communications fiber 110 and one control fiber 112. The communications fiber 110 provides the desired communication of optical signal, data, voice, video or other communications signals across the switch 104. The control fibers 112 transmit control signals used for alignment. In a simple case, one control fiber 112 could be associated, in known spatial relationship, with each of the communications fibers 110 to be interfaced at the switch. Due to the spatial relationships of the communications fibers 110 and control fibers 112 on both sides A and B, proper alignment of the communications fibers 110 can be attained and verified by transmitting control signals between the control fibers 112. For example, control signals may be transmitted from A side control fiber 112 to B side control fiber 112 that is associated with a signal detector. More complex control arrangements involving more than one control fiber per communications fiber, with attendant advantages, are set forth below.

Figure 7:
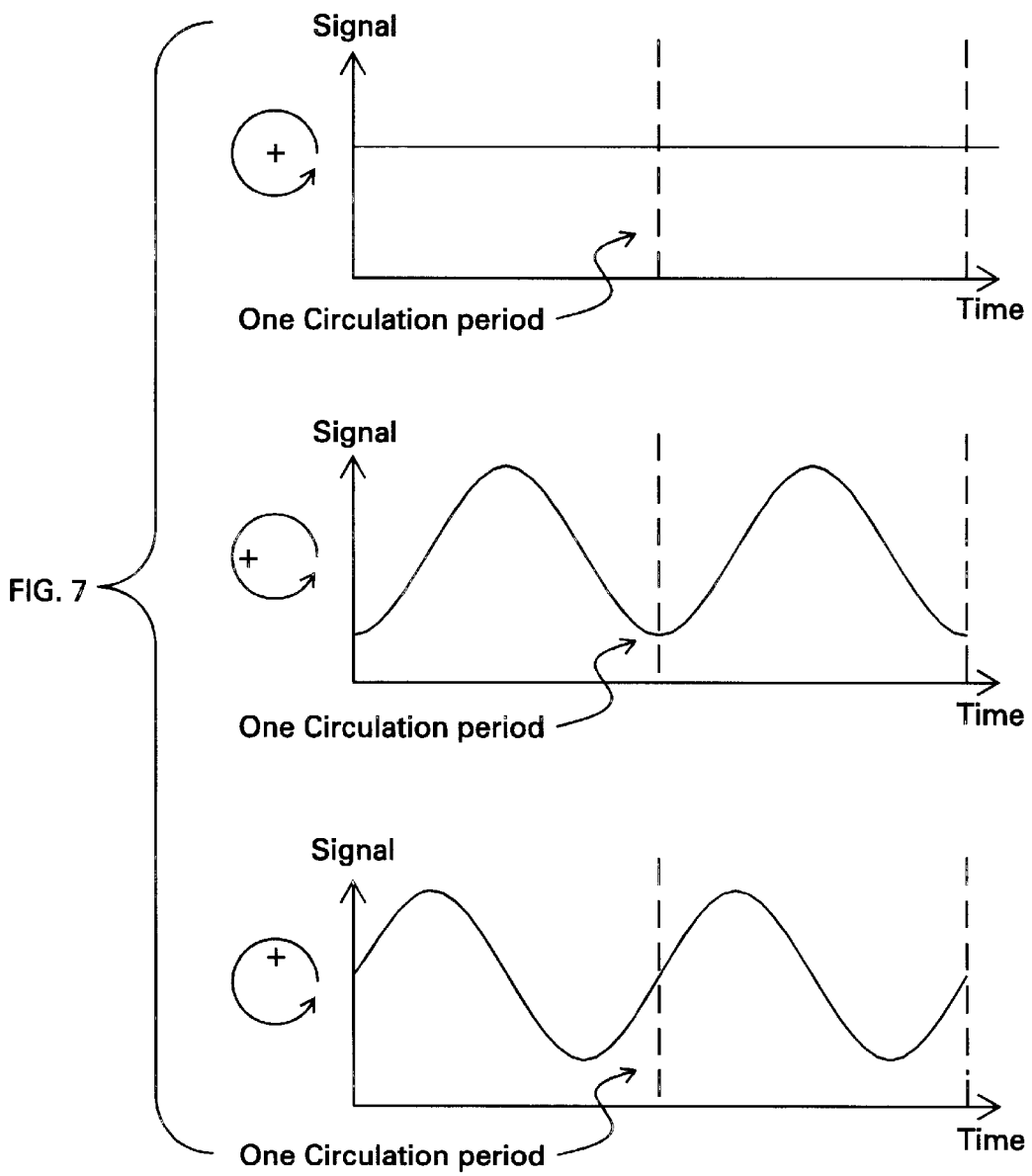
FIG. 7 is a graph illustrating the signals detected by a detector associated with the switch interface of FIGS. 6A–6C for various alignment situations.

FIG. 7 graphically illustrates how the control signals of the embodiment of FIGS. 6A, 6B and 6C can be used to obtain alignment information based on relative circular movement of the ferrules 100 and 102. Initially, the control fibers 112 are positioned in rough alignment so that a control signal can be transmitted therebetween. The A side ferrule 100, for example, can then be circulated about an axis which is parallel to fibers 110 and 112. The diameter of such circulation is smaller than the diameter of the fiber core. In this design, the connection between fibers is always less than optimal, to facilitate this type of servo control. The first graph of FIG. 7 illustrates the resulting signal for the case where the control fibers 112 are properly aligned. If the A side control fiber circulates equally around the proper alignment position, a fixed control signed (over time and angular position) will ensue as shown in the first graph. The second and third graphs show the resulting signal for a misalignment in first and second directions. As shown, the misalignment results in a control signal that is modulated with respect to circulation of the A ferrule 100. More particularly, the signal is modulated such that the amplitude of the modulated signal indicates the size of the alignment error and the phase of the modulated signal indicates the direction of the error. The modulated control signal can thus be analyzed by a processing unit to determine and implement the appropriate alignment correction.

It will thus be appreciated that the servo-alignment control system of the present invention involves one or more control signal sources and one or more control signal detectors. It is desirable to reduce the number of such control system components, particularly for the case of large scale 1×N switches. Such simplification is achieved in accordance with the present invention by locating both the control signal source(s) and detector(s) on the A or "1" side of the 1×N switch. Accordingly, the control signals transmitted from the A side source to the B side are retransmitted back from the B side to the A side detectors. Any appropriate structure can be used in this regard. For example, the B side control fibers could be bonded, at their remote ends, to a mirror block for reflecting the control signals. However, such bonding is problematic and increases the structural complexity of the switch.

Figure 8A:
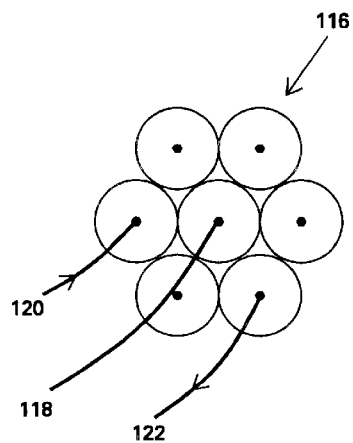
FIGS. 8A and 8B illustrate a fiber arrangement for a 1×N switch in accordance with the present invention.
Figure 8B:
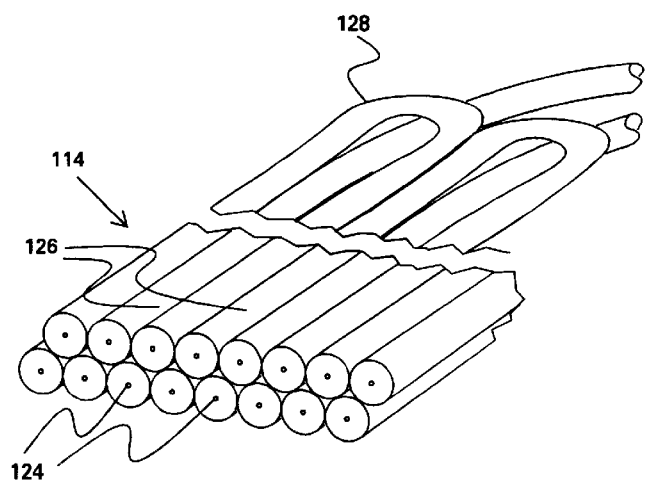

FIGS. 8A and 8B illustrate a fiber arrangement that allows for positioning of the control signal source and detector on the A side of the switch without requiring the B side control fibers to be bonded to a mirror. In the illustrated embodiment, the B side control fibers 114 are looped such that both ends of a given control fiber are located at the switch interface. More particularly, the A side fiber stack 116 of FIG. 8A includes a communications fiber 118, a source control fiber 120, on one side of the communications fiber 118, for transmitting control signals across the switch interface and a detector control fiber 122, on the other side of the communications fiber 118, for receiving control signals transmitted across the switch interface. The source control fiber 120 is optically coupled to a control signal source and the detector control fiber 122 optically coupled to a control signal detector.

On the opposite or B side of the switch interface, as illustrated in FIG. 8B, each row of the fiber stack 114 is arranged as a series of units, each unit including a communications fiber 124 having a pair of control fiber ends 126 (one on each side thereof) where the control fiber ends 126 of each unit are opposite ends of a single looped fiber 128. The looped fiber may be made by assembling two separate fibers to fiber stack 114 and then splicing together the two free ends thereof. Accordingly, a control signal from the control signal source is transmitted from the source, through the source control fiber 120, across the switch interface to a first end of the B side control fiber 128, through the B side control fiber to a second end thereof, across the switch interface to the detector control fiber 122 and through the detector control fiber to a signal detector surface of the control signal detector.

Figure 9A:
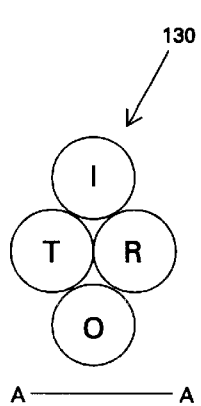
FIGS. 9A and 9B illustrate an alternative fiber arrangement for a 1×N switch in accordance with the present invention.
Figure 9B:
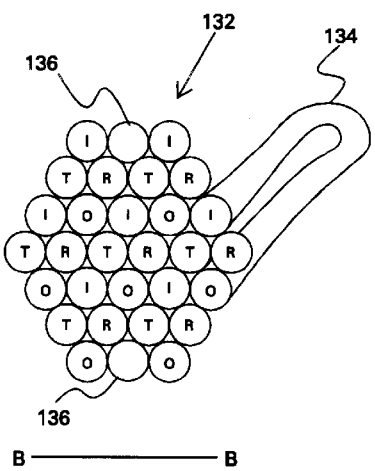

FIGS. 9A and 9B show the A and B sides 130 and 132, respectively, of a bidirectional 1×7 switch (that may alternatively be thought of as a 2×14 switch) employing looped control fibers 134 (only one shown) on the B side 132. The fibers in FIGS. 9A and 9B are designated as follows:

"T" indicates a communications fiber end for transmitting communications signals;

"R" indicates a communications fiber end for receiving communications signals;

"I" indicates a control fiber end for receiving input control signals; and

"O" indicates a control fiber end for transmitting output signals.

It will be appreciated that the illustrated switch allows for bi-directional communication of communications signals across the switch interface using dedicated communications signal transmission and receiver lines as may be desired. Each such pair of transmission and receiver lines is serviced, for alignment purposes, by a single pair of control fiber ends having a known spatial relationship to each of the communications lines. The B side stack 132 further includes two fiber ends 136 that are not used for transmitting or receiving communications signals or control signals but, rather, are included to stabilize the stack and maintain proper fiber positioning throughout the stack. FIG. 9B also shows a compact hexagonal fiber arrangement as discussed above.

It will be appreciated that the looped fiber construction of FIGS. 8B and 9B doubles the number of control fiber ends at the switch interface relative to a construction having the source and detector located on opposite sides of the switch interface. However, the arrangement reduces the number of sources and detectors required thereby reducing design complexity and expense. Moreover, such an increase in fiber ends at the switch interface can be easily accommodated due to the compact fiber stacking arrangements of the present invention. Some approximate positioning measurement is needed, so that switch control will lock on the correct fiber pair. This may be achieved by electrical or optical sensors with accuracy of better than 125 μm, the fiber outside diameter.

Figure 10:
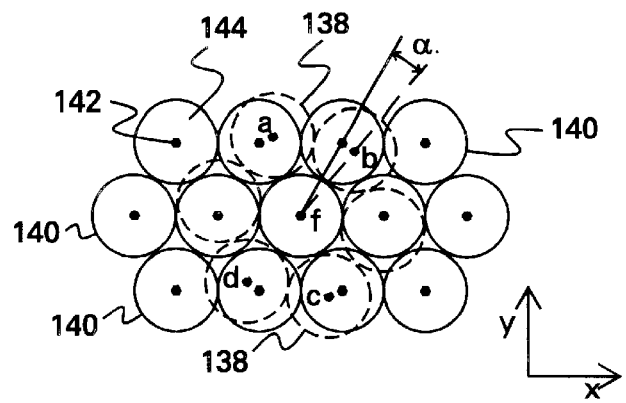
FIG. 10 illustrates a switch interface in accordance with the present invention involving an angular displacement as between the first and second side ferrules.

In some switches, optimal alignment is particularly important. Alignment control speed and accuracy can be improved by providing multiple control signals per communications fiber and offsetting the corresponding A and B side fiber ends. FIG. 10 shows A side fiber ends 138 in phantom superimposed on B side fiber ends 140 as projected relative to the direction of propagation of signals across the switch interface. The fiber cross sections show fiber cores 142 for signal transmission surrounded by cladding 144. The A side stack includes four source (or detector) control fibers, designated a, b, c and d, surrounding a communications fiber, designated f. Such a configuration may be used, for example, in connection with four control signal detectors (or sources) per communications fiber on the B side of the switch.

As shown in FIG. 10, the A ferrule is offset from the B ferrule by angle such that each of the A side control fiber end cores only partially aligns with the corresponding B side control fiber end core when the A and B communications fibers are properly aligned relative to the x and y axes. Based on this offset geometry, alignment error values E relative to the x and y axes can be obtained by co-processing the detected power (P) of signals corresponding to the a, b, c and d fibers as follows:

$$E_x=(P_c+P_d)-(P_a+P_b)$$

$$E_y=(P_b+P_c)-(P_a+P_d)$$

Figure 11:
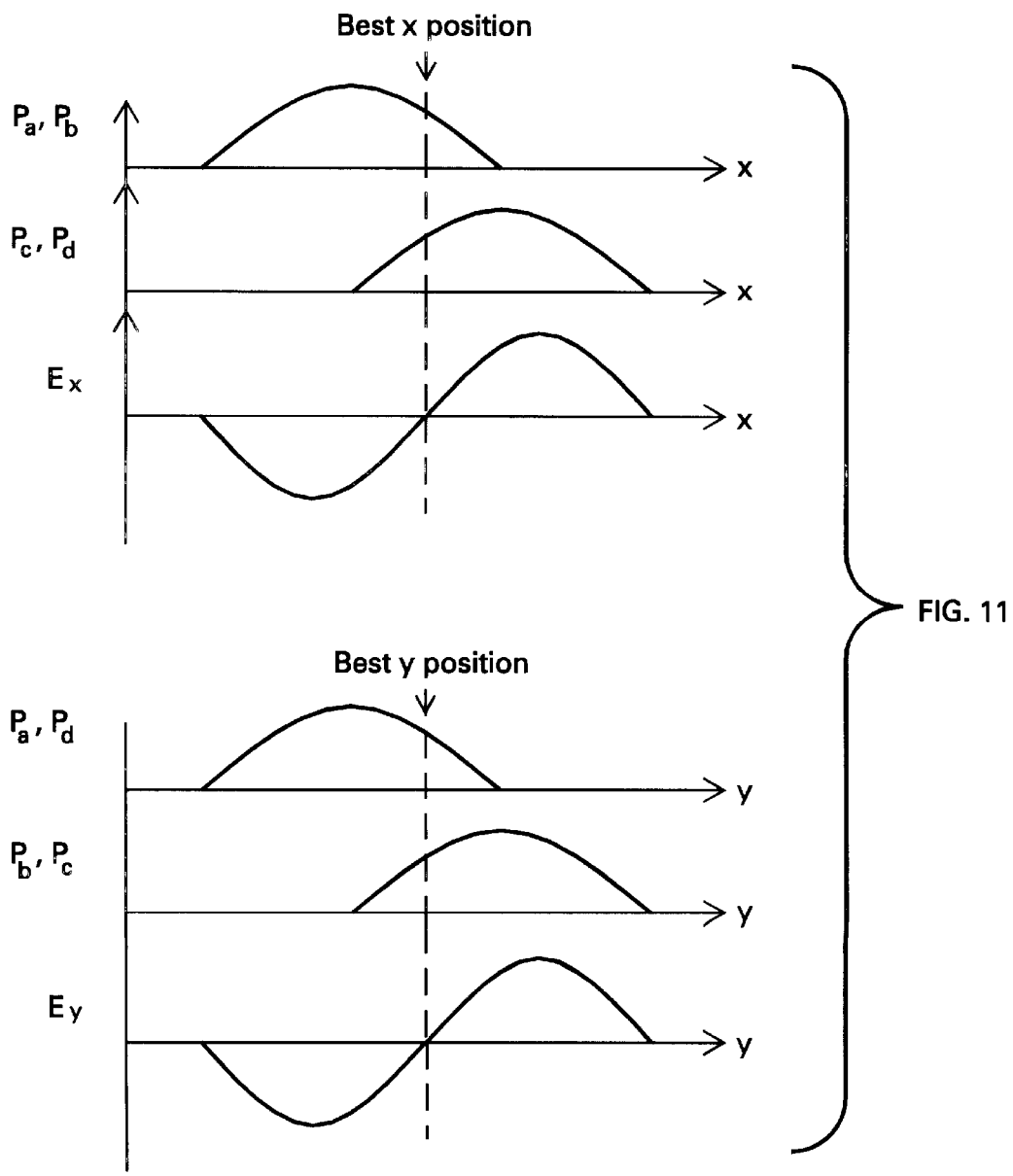
FIG. 11 is a graph illustrating an alignment process associated with the switch interface of FIG. 10.

These error functions, as well as the component terms thereof (in parenthesis above), are graphed against their respective axes in FIG. 11. As the graphs show, the offset fiber arrangement and related processing allow for convenient and accurate two dimensional alignment of the communications fibers. Such information can be used to drive x and y alignment motors, as discussed above, for closed loop servo alignment control.

In addition to providing for convenient and accurate two-dimensional alignment, the illustrated offset arrangement and processing provides for quick alignment response as may be desired, for example, in applications where vibration or shock can cause alignment errors. In this regard, it is noted that the embodiment of FIGS. 6–7 could require a full cycle of the A ferrule for properly determining an alignment error. By contrast, the embodiment of FIGS. 10–11 can provide instantaneous or substantially real time error determination and correction.

Figure 12:
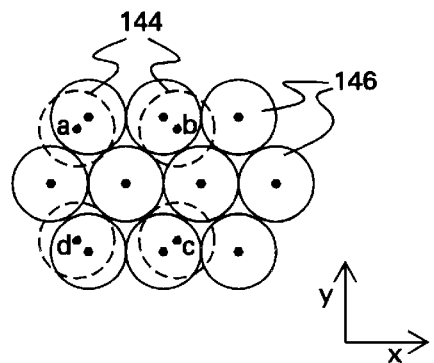
FIG. 12 illustrates a switch interface in accordance with the present invention involving control fibers displacement as between the first and second side of ferrules.

Similar offset fiber arrangement processing advantages can be obtained by providing an offset between control fibers of the A and B stacks based on the configuration of the A and/or B stacks rather than an angular offset between the A and B ferrules. FIG. 12 shows the A side stack in phantom 144 (including fibers a–d) superimposed on the B side stack 146, similar to the vantage point of FIG. 10. In this case, spacing is provided between the A side control fibers (as opposed to the close packed arrangement of prior embodiments) in order to achieve the desired offset control fiber and relationship. In this case, the x and y error functions are given, relative to the source control fibers a–d, by:

$$E_x=(P_b+P_c)-(P_a+P_d)$$

$$E_y=(P_d+P_c)-(P_a+P_b)$$

Proper two dimensional alignment thus involves zeroing of the functions $E_x$ and $E_y$. The proper spacing of the A side control fiber ends can be achieved through carefully dimensioning (i.e., by laser machining, EDM cutting or precise etching) the A side ferrule opening as will be understood from the description below. It will be appreciated that the offset arrangement illustrated in FIG. 12 can also accommodate multiple A side communications fibers.

Figure 13A:
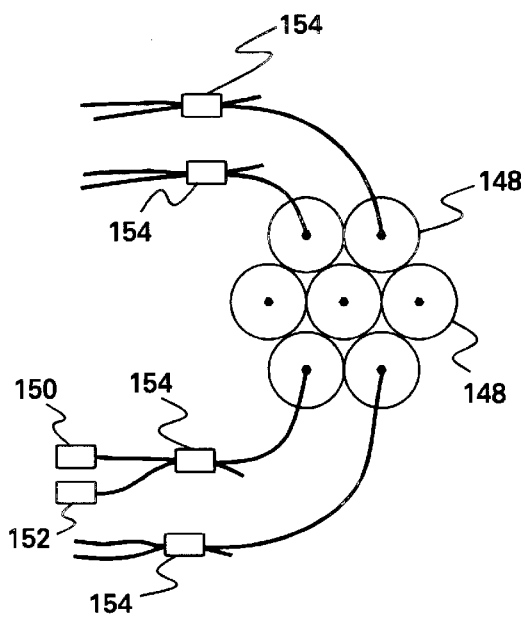
FIGS. 13A and 13B illustrate an alignment control system in accordance with the present invention involving a control signal source system and a control signal detector system both positioned on the "1" side of a 1×N switch in accordance with the present invention.
Figure 13B:
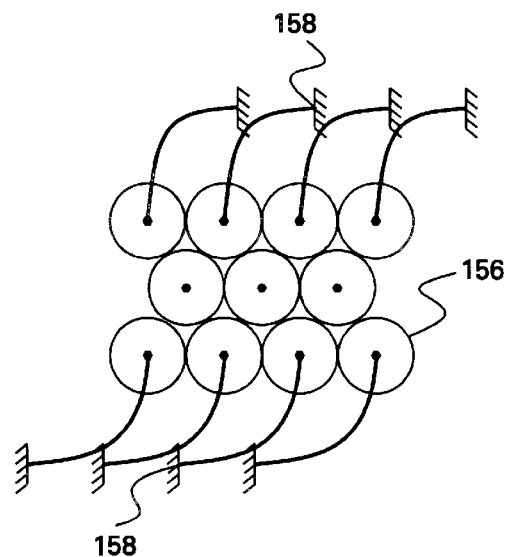

In this embodiment, like the embodiments described above, it is desirable to minimize the required control components, e.g., control signal sources and control signal detectors. However, the B side fiber ends associated with the fibers a–d cannot be coupled by looping an optical fiber without coupling measurements that need to remain separate. FIGS. 13A–13B illustrate an alternative arrangement for minimizing the required control components. In particular, FIG. 13A shows a source and detector arrangement on the A side of the switch and FIG. 13B shows the B side components. As shown in FIG. 13A, each of the control side fibers 148 is coupled to both a source 150 (only one shown) and a detector 152 (only one shown) via a coupler 154 such as a-3 dB coupler. Each of the B side control fibers 156, as shown in FIG. 13B, is terminated in a mirror block 158 to reflect the control signals back across the switch interface. Accordingly, for each of the control fibers, control signals are transmitted from the source 150 to the A side control fiber 148 via the coupler 154, across the switch interface to the corresponding B side of control fiber 156, reflected by mirror 158 back to the switch interface, transmitted across a switch interface to the A side of control fiber 148, and then transmitted to the detector 152 via the coupler 154. Although this arrangement minimizes the required control components, it will be appreciated that the coupler 154 entails significant cost increase and there is some loss involved with the optical couplers. In particular, half of the signal (3 dB) from the source goes to the A side ferrule, then to the B side ferrule and is reflected by the mirror 158. Of this reflected signal, only half is transmitted by the same coupler to the detector. However, this light loss is not substantial enough to impair operation.

Figure 14A:
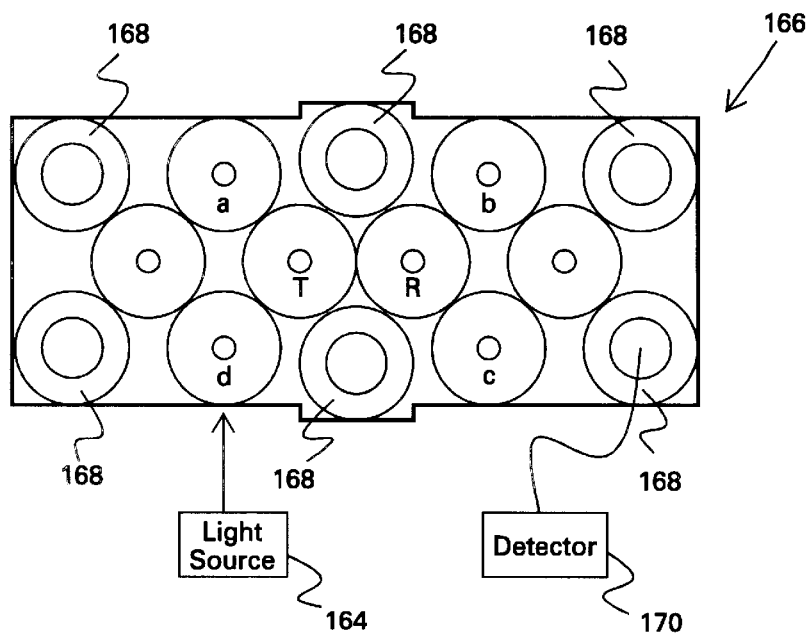
FIGS. 14A and 14B illustrate an alignment control system in accordance with the present invention involving a control signal source system and a control signal detector system both positioned on the "1" side of a 1×N switch.
Figure 14B:
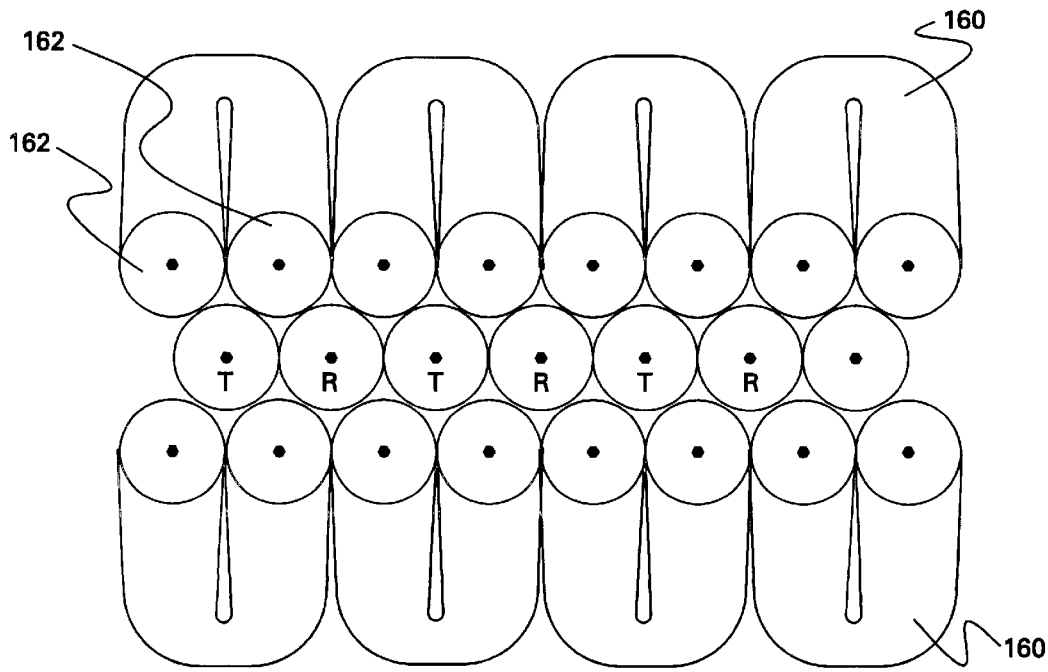

FIGS. 14A and 14B show an alternative offset arrangement and corresponding control system that avoids use of couplers and mirrored fibers. As shown, all fibers 160 in the odd rows of the B side ferrule are formed as pairs of looped fiber ends 162. Four signal sources 164 (only one shown) are connected to the a, b, c and d fibers of the A side 166. Six other fibers 168 on the A side are connected to control signal detectors. If desired, the six fibers 168 may have larger cores 172 than the other fibers to reduce criticality with respect to their positioning. Although only two of the fibers on the A side 166 are designated as communications fibers (the fibers designated as "T" and "R"), it will be appreciated that more complex arrangements would support additional communications fibers on the A side 166. For each possible position of the communications fiber(s), four of the detectors 170 will detect a signal that can be used for servo control as described above. FIG. 14A also shows an example of configuring the opening 174 of the ferrule so as to maintain a spaced relationship as between selected fibers of the A side stack. With regard to the differing size cores illustrated in this embodiment, examples of standard fibers include fibers with a 125 micron outside diameter and a 10 micron core and fibers with a 125 micron outside diameter and a 62.5 micron core. The offset between the fibers a, b, c and d and their counterparts on B ferrule may be, for example, 5 microns. The error functions are same as in the description of FIG. 12.

Figure 15:
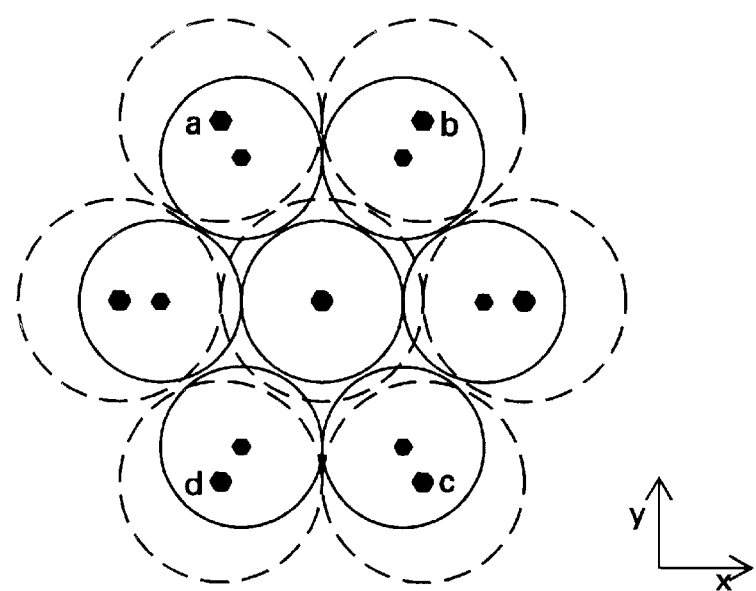
FIG. 15 shows an offset arrangement obtained by using fibers having differing diameters.

FIG. 15 shown an embodiment where the fibers in the A group are larger in outside diameter than the fibers in Group B. This may be achieved by using non-standard fibers for the A group having an outside diameter of 127.5 microns, thereby achieving 5 microns of offset with regard to the a, b, c, d, fibers. The associated error functions are:

$$Ex=(Pb+Pc)-(Pa+Pd)$$

$$Ex=(Pa+Pb)-(Pc+Pd)$$

Figure 16:
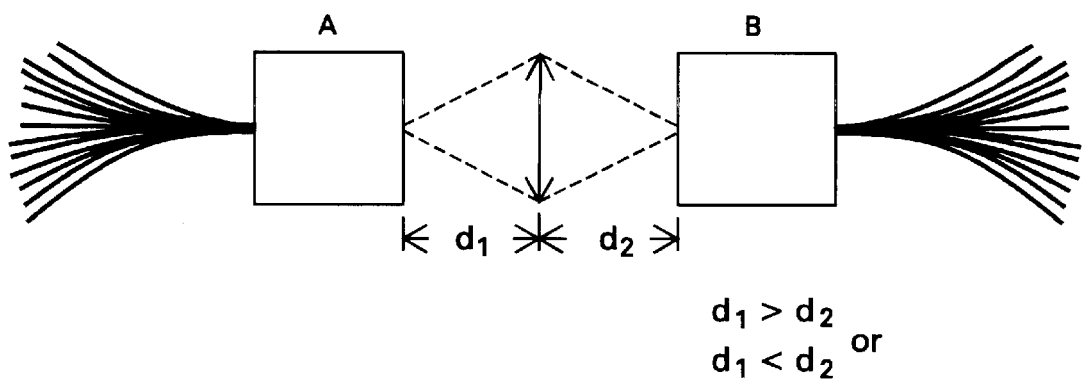
FIG. 16 shows a system for achieving an effect similar to an offset arrangement using optical magnification or demagnification.

Alternatively, the fibers in ferrule A may have a smaller diameter, as by etching these fibers to diameter of 122.5 microns. A similar result can be achieved by optically magnifying or reducing the image of ferrule A on ferrule B with a lens, as in the arrangement of FIG. 16, where the ferrules are located at different distances from the lens.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A fiber optic apparatus, comprising:
   first ferrule including a first fiber end of a first optical fiber for transmitting communication signals;
   a second ferrule including a first plurality of fiber ends ("first communications fiber end plurality") of a first plurality of communication fibers for transmitting communication signals;
   each of said first and second ferrules further including at least one control fiber for communicating control signals for use in aligning said first fiber end with a selected one of said first communications fiber end plurality;
   control means, operatively associated with said control fibers, for aligning said first fiber end and said selected one of said communications fiber end plurality based on said communicated control signals;
   said first and second ferrules being positioned that such said first fiber end and first said first communications fiber end plurality are optically opposed across an interface between said ferrules; and
   optical transmission means, disposed within said interface, for enhancing transmission of optical signals across said interface, said transmission means including a material having an index of reflection selected to reduce optical losses with regard to said optical signals transmitted across said interface.

2. A fiber optic apparatus as set forth in claim 1, wherein said first communications fiber and said control fiber of said first ferrule define a fiber bundle wherein said fibers are arranged in said bundle such that the relative positions of said fibers in said bundle are maintained during the life of the apparatus.

3. An apparatus as set forth in claim 2, wherein each of said first communications fiber and said first control fiber is in contact with at least two of said fibers of said bundle.

4. An apparatus set forth in claim 2, wherein six of said fibers in said bundle are arranged in generally hexagonal relationship relative to said first communications fiber.

5. An apparatus as set forth in claim 2, wherein at least four of said fibers of said bundle are control fibers for use in alignment of said first communications fiber with a selected one of said first communications fiber end plurality.

6. An apparatus as set forth in claim 1, wherein said first ferrule contains a second communications fiber.

7. An apparatus as set forth in claim 1, wherein each of said first and second ferrules is constructed from a material that is harder than quartz.

8. An apparatus as set forth in claim 1, wherein said material comprises a liquid or gel having an index of reflection that substantially matches an index of reflection of said first fiber end and an index of reflection of each of said fiber ends of said first communications fiber end plurality.

9. An apparatus as set forth in claim 1, wherein said first fiber end is formed at an angle relative to a direction of propagation of communication signals transmitted via said first optical fiber such that a signal portion reflected at said first fiber end is transmitted at an angle, relative to said first communications fiber end plurality, that is greater than acceptance of said first communications fiber end plurality.

10. An apparatus as set forth in claim 1, further comprising means for providing relative movement as between said first and second ferrules so as to align said first fiber end with a selected one of said fiber ends of said first communications fiber end plurality for optical communication therebetween.

11. An apparatus as set forth in claim 1, wherein said control means comprises a first plurality of control fibers (first control fiber plurality) disposed in known relationship to said first communications fiber in said first ferrule, and a second plurality of control fibers (second control fiber plurality) disposed in known relationship to said selected one of said first communications fiber end plurality, wherein control signals are transmitted between said first control fiber plurality and said second control fiber plurality;
   a plurality of detectors for detecting said control signals transmitted between said first control fiber plurality and said second control fiber plurality; and
   positioning means for adjusting a relative position of said first and second ferrules based on said control signals detected by said plurality of detectors.

12. A fiber optic apparatus, comprising:
   first ferrule including a first fiber end of a first optical fiber for transmitting communication signals;
   a second ferrule including a first plurality of fiber ends ("first communications fiber end plurality") of a first plurality of communication fibers for transmitting communication signals;
   each of said first and second ferrules further including at least one control fiber for communicating control signals for use in aligning said first fiber end with a selected one of said first communications fiber end plurality;
   control means, operatively associated with said control fibers, for aligning said first fiber end and said selected one of said communications fiber end plurality based on said communicated control signals; and
   said first and second ferrules being positioned that such said first fiber end and first said first communications fiber end plurality are optically opposed across an interface between said ferrules.

13. An apparatus as set forth in claim 12, wherein each of said first and second ferrules is constructed from a material that is harder than quartz.

14. An apparatus as set forth in claim 12, wherein said material comprises a liquid or gel having an index of reflection that substantially matches an index of reflection of said first fiber end and an index of reflection of each of said fiber ends of said first communications fiber end plurality.

15. An apparatus as set forth in claim 12, wherein said first fiber end is formed at an angle relative to a direction of propagation of communication signals transmitted via said first optical fiber such that a signal portion reflected at said first fiber end is transmitted at an angle, relative to said first communications fiber end axis, that is greater than acceptance of said first communications fiber.

16. An apparatus as set forth in claim 12, further comprising means for providing relative movement as between said first and second ferrules so as to align said first fiber end with a selected one of said fiber ends of said first communications fiber end plurality for optical communication therebetween.

17. An apparatus as set forth in claim 12, wherein said first ferrule contains a second communications fiber.

18. A fiber optic apparatus as set forth in claim 12, wherein said first communications fiber and said control fiber of said first ferrule define a fiber bundle wherein said fibers are arranged in said bundle such that the relative positions of said fibers in said bundle are maintained due to contact between said fibers.

19. An apparatus as set forth in claim 12, wherein each of said first communications fiber and said first control fiber is in contact with at least two of said fibers of said bundle.

20. An apparatus set forth in claim 12, wherein six of said fibers in said bundle are arranged in generally hexagonal relationship relative to said first communications fiber.

21. An apparatus as set forth in claim 12, wherein at least four of said fibers of said bundle are control fibers for use in alignment of said first communications fiber with a selected one of said first communications fiber end plurality.

22. An apparatus as set forth in claim 12, wherein said control means comprises a first plurality of control fibers (first control fiber plurality) disposed in known relationship to said first communications fiber in said first ferrule, and a second plurality of control fibers (second control fiber plurality) disposed in known relationship to said selected one of said first communications fiber end plurality, wherein control signals are transmitted between said first control fiber plurality and said second control fiber plurality;
   a plurality of detectors for detecting said control signals transmitted between said first control fiber plurality and said second control fiber plurality; and
   positioning means for adjusting a relative position of said first and second ferrules based on said control signals detected by said plurality of detectors.

\* \* \* \* \*

UNITED STATES PATENT AND TRADEMARK OFFICE
CERTIFICATE OF CORRECTION

PATENT NO : 6,031,947
DATED : February 29, 2000
INVENTOR(S) : Herzel Laor

It is certified that error appears in the above-identified patent and that said Letters Patent are hereby corrected as shown below:

At column 12, line 38, after "and", delete --first--

Signed and Sealed this

Twenty-fourth Day of April, 2001

Attest:

NICHOLAS P. GODICI

*Attesting Officer*   *Acting Director of the United States Patent and Trademark Office*